Dec. 6, 1955    R. SHAPIRO    2,726,324
LAMP BASES
Filed June 30, 1953
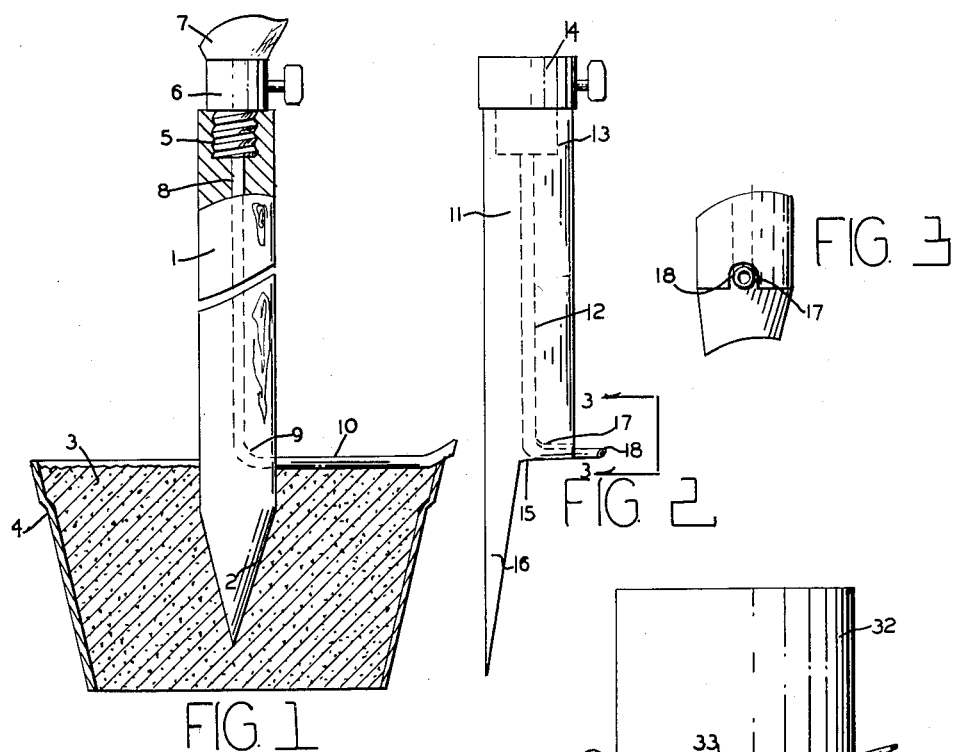
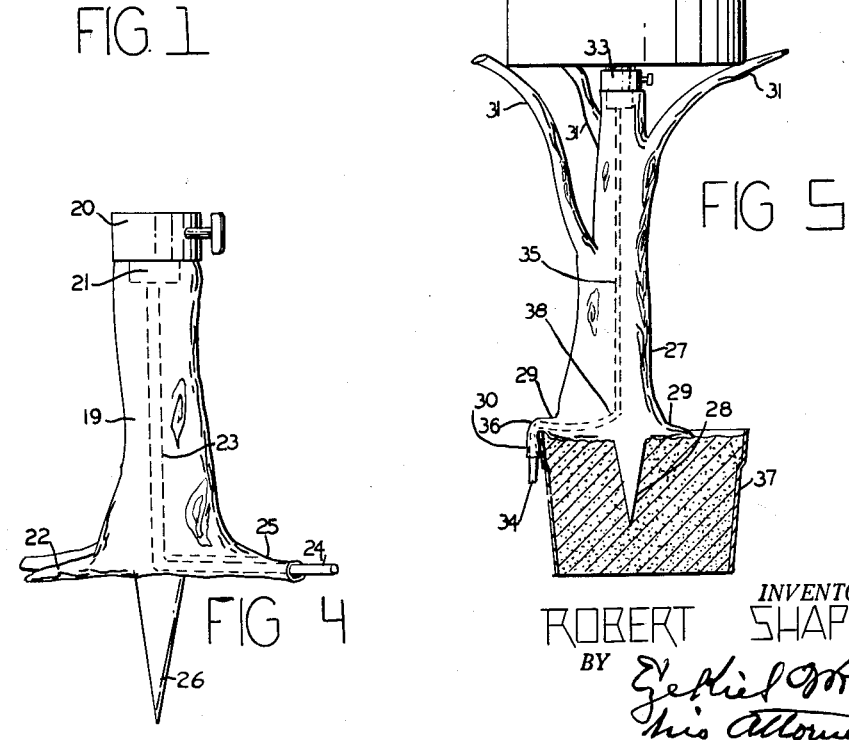
INVENTOR.
ROBERT SHAPIRO
BY
his Attorney

2,726,324
LAMP BASES

Robert Shapiro, Mattapan, Mass.

Application June 30, 1953, Serial No. 365,157

2 Claims. (Cl. 240—81)

The present invention relates to lamp bases.

It is an object of the present invention to provide a lamp base which may be used in connection with a flower pot or bowl containing soil from which a plant is growing. In this invention, a shaft of wood, plaster or other suitable material is provided with an electric fitting at one end for receiving an electric light bulb and with a spiked or tapered section at the other end which maybe set into the soil providing an attractive combination lamp and plant. It is further an object of this invention to provide a lamp shaft for use in the fitting hereinbefore set forth which is provided with means for concealing the electrical connection and which is further provided with means for securing the lamp shaft firmly in shallow flower pots, bowls and containers filled with earth.

A still further object of this invention is to provide a lamp shaft used in connection with flower pots, bowls and the like, which may be secured at or near the side of these containers and which have openings for electrical wiring connections which are so disposed as to normally conceal the wiring.

These and other objects and advantages of the present invention will be more clearly understood when considered in connection with the accompanying drawings in which:

Figure 1 shows a partially sectional side elevation of the invention.

Figure 2 shows a side elevation of a modification.

Figure 3 shows a fragmentary view taken along the line 3—3 of Figure 2.

Figures 4 and 5 show modifications of the invention.

Referring particularly to Figure 1, the lamp shaft 1 may be made of wood, metal, plastic material, plaster or similar material. This shaft has a tapered end or spike 2 adapted to be driven into the packed soil 3 of the flower pot or similar container 4. At the upper end of this shaft, is a recess 5 which may be threaded or otherwise adapted to receive and firmly hold the lower end of an electrical socket 6 which in turn is provided to receive an electric lamp 7. Extending longitudinally through the center of the shaft is a hole 8 which extends from the lower end of the recess 5 downward to a point 9 in the shaft 1 which is normally on a level with the soil 3 when the shaft is embedded into the soil. This hole is provided to receive an electrical wiring connection 10 between the socket 6 and a wall plug or other power source. In this construction, the shaft 1 may be placed as close to the edge of the pot or container 5 as desired.

With reference to Figure 2, there is illustrated a modification of the invention in which a hole 12 extends longitudinally through the center of the shaft 11 from the recess 13, which is provided to receive the socket 14, down to the shoulder 15. This shoulder 15 rests on the surface of the soil when the pointed end 16 of the shaft 11 is driven vertically into the soil. A horizontal groove 17 extending at right angles to the hole 12 is provided in the surface of the shoulder 15 so that an electrical wire 18 may extend along this groove 17 into the hole 12 to a connection at one end with the socket 14. In this modification, the shoulder 15 provides a support for the shaft and further permits a construction which is simpler to manufacture than that shown in Figure 1. The groove 17 permits the face of the shoulder 15 to come into actual contact with the surface of the soil.

With reference to the modification as shown in Figure 4, there is illustrated a lamp shaft 19 provided with a socket 20 in a recess 21, similar to those described in Figures 1 and 2. The shaft of Figure 4 is shaped in the form of a tree trunk having roots 22 extending outwardly from the base of the trunk. A hole 23 for an electric wire 24 from the socket 20 extends longitudinally through the center of the shaft 19.

A groove 25 at the bottom of the trunk extends at right angles from the hole 23. This groove 25, which is provided to contain the electric wire 24, may be cut in a line extending under one of the roots 22 which normally extends close to the edge of the container so that the wire 24 will normally be concealed along its length near the base of the tree trunk. A tapered shaft 26 extends from the lower surface of the tree trunk to be driven into the packed soil for additional support to this trunk.

In the modification illustrated in Figure 5, there is shown a shaft 27 in the form of a tree trunk which is provided with a tapered end 28 adapted to be driven into the packed soil, and root members 29, one of which is provided with downwardly curved extension 30 which is adapted to engage the top edge of a flower pot or other container to firmly secure the lamp shaft in position. Extending from the side of the shafts towards its upper end are several extensions in the form of branches 31. These branches 31 are disposed about the shaft 27 in such a manner as to support a lamp shade 32 of any desired size. At the upper end of the shaft 27 is provided an electric light socket 33 secured in the shaft in a manner similar to that previously described. An electric wire 34 extends through the hole 35 which in turn extends longitudinally of the shaft 27 from the socket 33 to the lower end. A groove 36 in the surface of the lower end of the shaft, is provided to receive that part of the wire 34 which is adjacent the lower part of the lamp shaft. This groove 36 extends from the lower end of the hole 35 outwardly along the lower end of the shaft and the lower side of the root member 29 having a curved extension 30. Thus, the wire 34 may extend along this groove to a point outside of the container.

In this invention, if desired, a metal tube 38 or other fire proof lining may be inserted in the hole extending longitudinally through the shaft of the various modifications. Further a bent section of this tube 38 may extend along the groove section. As an alternative construction, the electric wire may actually be permanently fixed within the hole in the manufacture of the shaft.

Having now described my invention, I claim:

1. A lamp base of the type described comprising an elongated shaft in the form of a tree trunk, a plurality of branch shaped elements extending angularly upward from the sides of said shaft providing means for supporting the lower peripheral edge of a frusto-conical lamp shade, root shaped elements extending horizontally from the lower end of said shaft providing a base for the shaft, a tapered extension from the lower end of said shaft adapted to be inserted into a yieldable material to support the shaft, means at the top of said shaft to receive an electric socket, a hole extending longitudinally through said shaft from said means to the lower end of said shaft, and a groove formed in said lower end of the shaft and communicating with said hole, said hole and groove being adapted to receive an electrical conductor communicating with the socket.

2. A lamp base of the type described comprising an elongated shaft in the form of a tree trunk, a plurality of root shaped elements extending horizontally from the lower end of said shaft providing a base for the shaft, one of said elements having a downwardly turned end adapted to lay over the wall of a container, a tapered extension depending from the lower end of said shaft providing a stake for mounting the shaft, means at the top of said shaft for receiving an electric socket, a hole extending longitudinally through said shaft from said means to the lower end, and a groove formed in the lower surface of said root shaped element having a downwardly turned end, said groove extending continuously from the hole to the end of said element, said hole and groove being adapted to receive a conductor communicating with the socket.

References Cited in the file of this patent

UNITED STATES PATENTS

| | | |
|---|---|---|
| 742,871 | Hummel | Nov. 3, 1903 |
| 1,656,148 | Harris | Jan. 10, 1928 |
| 1,677,972 | Marks | July 24, 1928 |
| 1,784,474 | Wilson | Dec. 9, 1930 |
| 1,819,733 | Castelli | Aug. 18, 1931 |
| 2,188,529 | Corina | Jan. 30, 1940 |
| 2,277,532 | Smith | Mar. 24, 1942 |
| 2,450,141 | Hobbs | Sept. 28, 1948 |
| 2,633,360 | Fleigle | Mar. 31, 1953 |

FOREIGN PATENTS

| | | |
|---|---|---|
| 300,961 | Italy | Sept. 22, 1932 |
| 573,350 | Great Britain | Nov. 16, 1945 |